(12) United States Patent
Lovell et al.

(10) Patent No.: US 7,632,204 B2
(45) Date of Patent: Dec. 15, 2009

(54) TRANSFER CASE WITH LOW GEAR RATIO

(75) Inventors: Christopher W. Lovell, Westlake, OH (US); Charles A. Barnow, Berea, OH (US)

(73) Assignee: Lovell Engineering, LLC, Berea, OH (US)

( * ) Notice: Subject to any disclaimer, the term of this patent is extended or adjusted under 35 U.S.C. 154(b) by 428 days.

(21) Appl. No.: 11/553,256

(22) Filed: Oct. 26, 2006

(65) Prior Publication Data

US 2007/0105687 A1    May 10, 2007

Related U.S. Application Data

(60) Provisional application No. 60/596,881, filed on Oct. 27, 2005, provisional application No. 60/596,895, filed on Oct. 28, 2005.

(51) Int. Cl.
*F16H 37/02* (2006.01)
(52) U.S. Cl. .................................................. 475/219
(58) Field of Classification Search ................. 475/219, 475/302, 290, 295, 317
See application file for complete search history.

(56) References Cited

U.S. PATENT DOCUMENTS

| | | | |
|---|---|---|---|
| 3,926,359 A | 12/1975 | Victory | |
| 4,995,862 A | 2/1991 | Arocha | |
| 5,012,905 A | 5/1991 | Tanaka | |
| 6,056,666 A | 5/2000 | Williams | |
| 6,533,692 B1 | 3/2003 | Bowen | |
| 6,951,522 B2 | 10/2005 | Baxter, Jr. et al. | |
| 7,004,876 B2 | 2/2006 | Puiu | |

OTHER PUBLICATIONS

International Search Report and Written Opinion for corresponding PCT application No. PCT/IB06/53973 mailed Apr. 28, 2008.
http://www.klunev.com/marlin_intro_articl.htm, Marlin Crawler for Early Bronco, Jan. 24, 2007.
http://www.explorer4x4.com/atlas_2/html, Advanced Adapters Atlas II 4.3:1 Transfer Case, Jan. 24, 2007.
http://www.klunev.com/apps_manual_new_page_2a.htm, Klune-V Extreme Underdrive Applications Manual, Mar. 15, 2007.
International Preliminary Report of Patentability received from the International Bureau of WIPO for corresponding PCT Application No. PCT/IB2006/053973 (Mar. 10, 2009).

*Primary Examiner*—Dirk Wright
(74) *Attorney, Agent, or Firm*—Hahn, Loeser & Parks, LLP; William S. Nabors

(57) ABSTRACT

A transfer case is provided utilizing dual planetary gearsets to provide a low gear ratio that can be engaged and disengaged on the fly without binding of gears. The transfer case provides an option for engaging the front, rear, both front and rear, or none of the wheels of a vehicle and is especially suited for off road vehicles such as rock crawlers.

19 Claims, 7 Drawing Sheets

TRANSFER CASE WITH LOW GEAR RATIO

The present application claims the benefit of U.S. Provisional Patent Application Ser. No. 60/596,881, filed Oct. 27, 2005, and U.S. Provisional Patent Application Ser. No. 60/596,895, filed Oct. 28, 2005, both herein incorporated by reference.

TECHNICAL FIELD

The present invention relates to transfer cases and, more particularly, to a transfer case utilizing dual planetary gear sets to provide a low gear ratio that can be engaged and disengaged on the fly without binding of gears. The transfer case provides an option for engaging the front, rear, both front and rear, or none of the wheels of a vehicle.

BACKGROUND OF THE INVENTION

Off-road four wheeling, including hill and rock climbing, has long been popular with outdoor enthusiasts. In recent years, rock climbing, now commonly referred to as rock crawling, has grown exponentially in popularity. Rock crawling is a now a competitive sport utilizing a vehicle, a driver, and a spotter. The vehicle is typically classified in one of three competitive classes depending on the amount and type of modifications made to the vehicle to enhance its rock crawling ability. The rock crawling competition is a trials type of event, and scored much like a game of golf. The course on which the teams compete is laid out in a series of "obstacles". The team with the lowest score is named the winner. The teams are scored with penalty and bonus points. General penalties include: stopping for more than four seconds, backing up, hitting the cones that are used to lay out the course, use of their winch, and using too much time. General bonus points are awarded for: not using a spotter's strap, progression gates, and hard bonus routes.

The rock crawling phenomenon has fueled a growing niche industry for aftermarket vendors of performance components for rock crawling vehicles including tires, suspensions, steering, drivetrains, etc. The most important of these performance improvements has been the development of options for achieving lower gear ratios, especially when considering that the growth of the sport has also resulted in the development of ever increasingly difficult trails and obstacles. Vehicles must typically have final crawl ratios ranging from about 100:1 to more than 200:1 to have a chance to negotiate some of the tougher obstacles.

The quest for low gear ratios has included lower ratios in each of the three components of the traditional drivetrain— the transmission, the transfer case, and the differential. The crawl ratio is determined by multiplying the highest gear reduction of these members. For example, a transmission having a first gear ratio of 4:1, a differential axle ratio of 5:1, and a transfer case with a low gear ratio of 4:1 results in a crawl ratio of 80:1. In seeking to increase the gear ratios, however, it has been found that the options for lower gear ratios at the transmission are limited by the available gearboxes themselves. Likewise, many differentials are limited by the available ring and pinion gear sets. Transfer cases utilizing chains or belts are typically not considered to be strong enough for rock climbing.

The transfer case provides the best option for achieving lower gear ratios. The general options available include: lower gear sets for existing transfer cases such as the Dana 300; new aftermarket transfer cases with low gear ratios such as the Atlas II from Advance Adapters; aftermarket gear reduction units mated to existing transfer cases such as the Klune-V; and double transfer case arrangements such as the Marlin Crawler. For shorter wheel base vehicles, the mating of aftermarket gear reduction units to existing transfer cases is impossible due to the lack of space available for the rear drive axle. The same problem exists for double transfer case arrangements.

One of the best performers has been the Atlas, and now the Atlas II transfer case, from Advanced Adapters. These units are known for their ruggedness and dependability and have a relatively small length. However, rock crawling competition creates some problems that are not particularly suited to the Atlas and other like transfer cases utilizing gears with shift fork slides. In rock crawling, it is often required to quickly engage or disengage the front and/or rear wheels. With gears and shift fork slides, the gears tend to bind, which prevents shifting. The driver often has to completely stop the vehicle or even go in reverse to shift the binded gears. As previously mentioned, stopping and reverse are penalized in rock climbing. It would, therefore, be an advantage to overcome one or more of the problems associated with the prior art transfer cases.

SUMMARY OF THE INVENTION

The present invention provides a transfer case having a low gear ratio, the transfer case comprising: an input shaft providing power in the form of torque; a first output shaft and a second output shaft; a first planetary gearset having a sun gear, a carrier having a plurality of planetary gears, and a ring gear, wherein the sun gear is rotatably coupled to the input shaft and the carrier is coupled to the first output shaft; a second planetary gearset having a sun gear, a carrier having a plurality of planetary gears, and a ring gear, wherein the carrier is coupled to the second output shaft; an idler gear, wherein the idler gear is rotatably driven by a gear rotatably coupled to the input shaft and wherein the idler gear rotatably drives a gear that is attached to the sun gear of the second planetary gearset; a first holding member adapted to selectively hold the ring gear of the first planetary gear set to cause the first output shaft to rotate in an underdrive condition with respect to the input shaft; a second holding member adapted to selectively hold the ring gear of the second planetary gear set to cause the second output shaft to rotate in an underdrive condition with respect to the input shaft.

BRIEF DESCRIPTION OF THE DRAWINGS

The invention will now be described in further detail with reference to the accompanying drawings, in which.

DETAILED DESCRIPTION OF THE DRAWINGS

Figure 1:
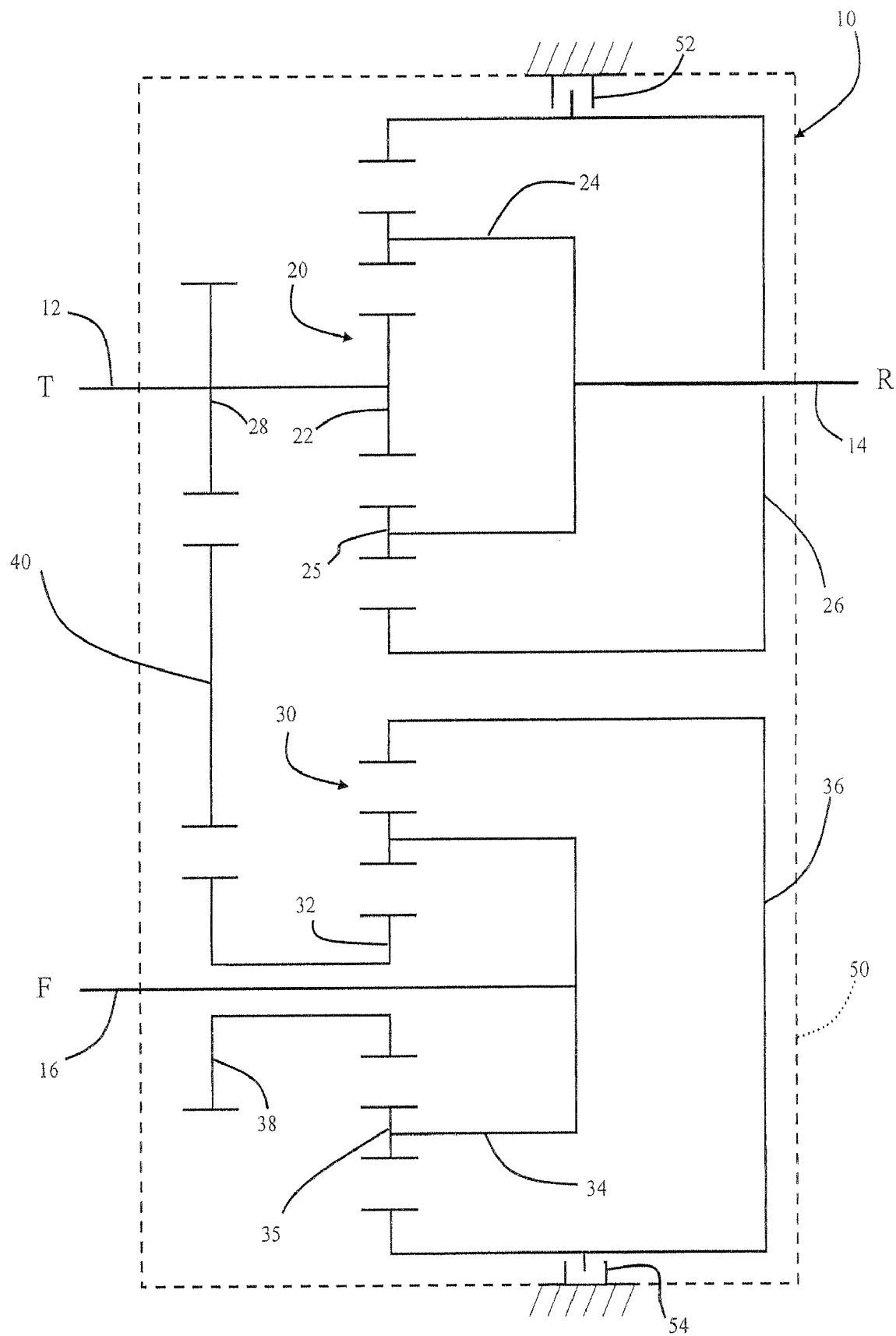
FIG. 1 is a schematic view of a first embodiment of the transfer case of the present invention.

A first embodiment of the invention is shown schematically in FIG. 1. A transfer case 10 of a vehicle comprises an input shaft 12 from the transmission (not shown), a first output shaft 14 drivingly connected to the rear wheels (not shown) and a second output shaft 16 drivingly connected to the front wheels (not shown). The transfer case 10 further comprises a first planetary gearset 20 and a second planetary gearset 30. The first planetary gearset 20 includes a sun gear 22, a planetary carrier 24 having a plurality of planet gears 25, and a ring gear 26. The second planetary gearset 30 includes a sun gear 32, a planetary carrier 34 having a plurality of planet gears 35, and a ring gear 36. A gear 28 is rotatably coupled to the input shaft 12 and drivingly engages an idler gear 40, which in turn, drivingly engages a gear 38 which is coupled to the sun gear 32 of the second planetary gearset 30.

When none of the members of a planetary gearset are held, no power will be transmitted from the input to the output members. In order to provide a low gear ratio transfer case, the present invention utilizes holding members 52, 54 such as a band which is fixed to the transfer case housing 50 (shown in phantom). A first holding member 52 selectively engages the ring gear 26 of the first planetary gearset 20. When the holding member 52 engages the ring gear 26, the ring gear 26 does not rotate. The input shaft 12 causes the sun gear 22 to drive the planet gears 25 to rotatingly walk about the stationary ring gear 26, causing the planetary carrier 24 to rotate in the same direction as the input shaft 12. The gear ratio is determined by the number of teeth of the sun gear 22 and ring gear 26, and is equivalent to one plus the ratio of the number of teeth of the ring gear 26 divided by the number of teeth of the sun gear 22. The gear ratio represents a reduction wherein the input shaft 12 and sun gear 22 rotate faster than the planetary carrier 24 and the first output shaft 14.

A second holding member 54 selectively engages the ring gear 36 of the second planetary gearset 30. When the holding member 54 engages the ring gear 36, the ring gear 36 does not rotate. The input shaft 12 rotates idler gear 40 which rotates gear 38 and sun gear 32 to drive the planet gears 35 to rotatingly walk about the stationary ring gear 36. As with the first planetary gearset 20, the second planetary gearset 30 provides a gear ratio reduction wherein the input shaft 12 and sun gear 32 rotate faster than the planetary carrier 34 and the second output shaft 16.

The transfer case 10 allows the operator of the rock crawling vehicle to have superior maneuverability. For example, in approaching a vertical wall, the operator can disengage the rear wheels and engage the front wheels. The rotating fronts wheels can then crawl up the wall without being pushed forward by the rear wheels. The operator can then quickly engage the rear wheels when the front wheels are over the obstacle without worrying about gear binding. The transfer case also allows better control for directional control of the vehicle while turning or digging while rock climbing.

Figure 2:
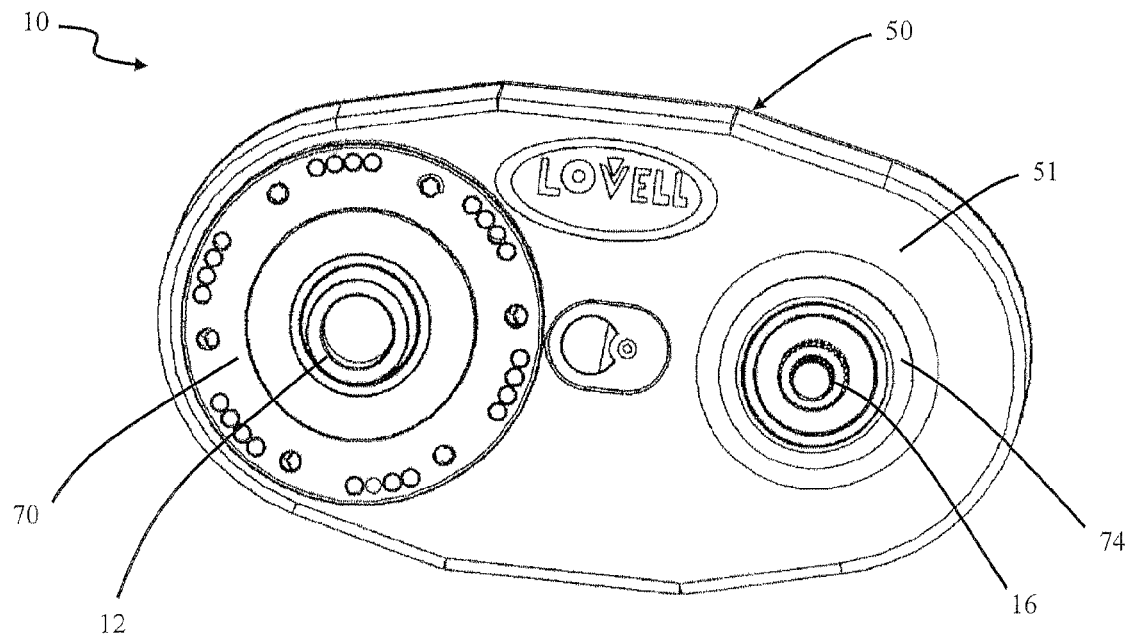
FIG. 2 is a front view of an embodiment of an assembled transfer case of the present invention.

Referring now to FIG. 2, a front view of the input or front side of the assembled transfer case 10 is shown having the transfer case housing shell portion 51 of the transfer case housing 50. The input shaft 12 and second output shaft 16 protrude from the input bearing housing adapter plate 70 and the front output bearing housing 74 attached to the transfer case housing shell portion 51, respectively.

Figure 3:
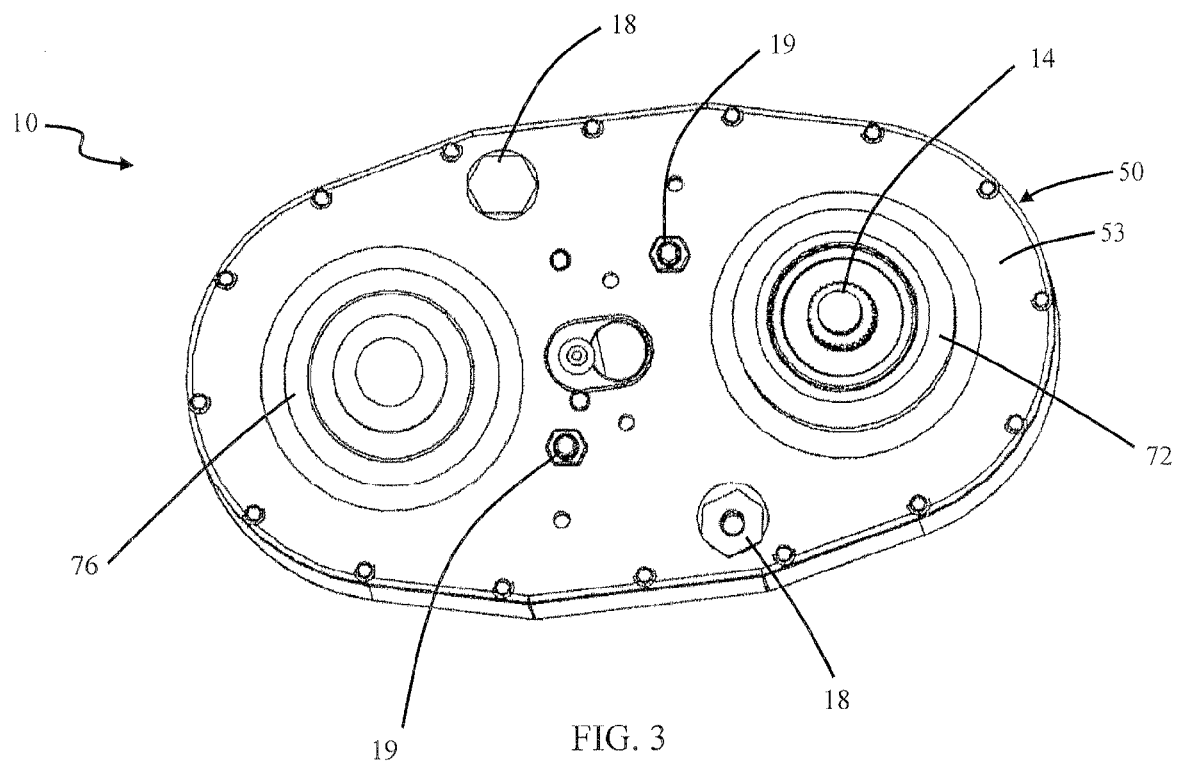
FIG. 3 is a rear view of an embodiment of an assembled transfer case of the present invention.

In FIG. 3, an output or rear side housing cover 53 of the assembled transfer case 10 is shown. The first output shaft 14 protrudes from the rear output bearing housing 72 formed in the housing cover 53 of the transfer case housing 50. Fluid ports 18 and brake band adjusters 19 are shown attached to the housing cover 53. The front bearing cover 76 is also shown integral to the housing cover 53.

Figure 4:
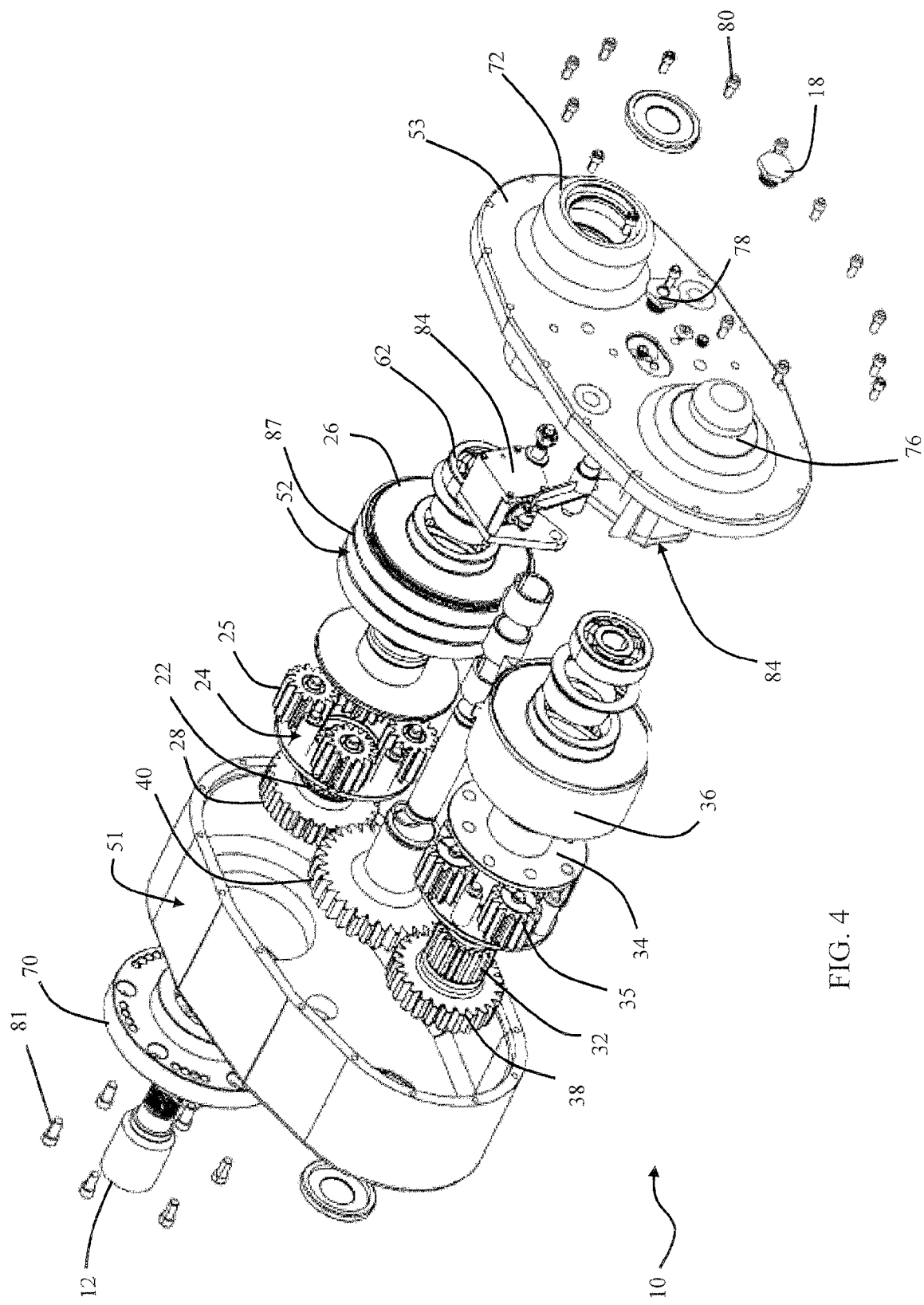
FIG. 4 is an exploded perspective view of the transfer case assembly of FIG. 2.

Referring now to FIG. 4, the transfer case 10 is shown in an exploded view. The transfer case comprises a housing shell portion 51 and housing cover 53 attached by a plurality of fasteners 80. An adapter plate 70 is attached to the front of the housing shell portion 51 by fasteners 81 on the input shaft side of the housing shell 51, the input shaft 12 extending therethrough and into housing shell portion 51. The input shaft 12 is coupled to gear 28 and sun gear 22. Sun gear 22 engages the planet gears 25 of planetary carrier 24. The planetary carrier 24 is housed in ring gear 26. Holding member 52 shown herein in the form of a double wrap brake band is positioned about the outer drum of the ring gear 26. The front and rear output shaft is not shown to better show the other elements of the transfer case 10. Gear 28 drivingly engages idler gear 40 which drivingly engages gear 38 which is attached to sun gear 32. Sun gear 32 engages the planet gears 35 of planetary carrier 34. The planetary carrier 34 is housed in ring gear 36. Holding member 54 is not shown in order to show the outer drum of ring gear 36. Holding member actuator assemblies 84 are also shown. Fluid port plugs 82 are attached to housing cover 53.

Figure 5:
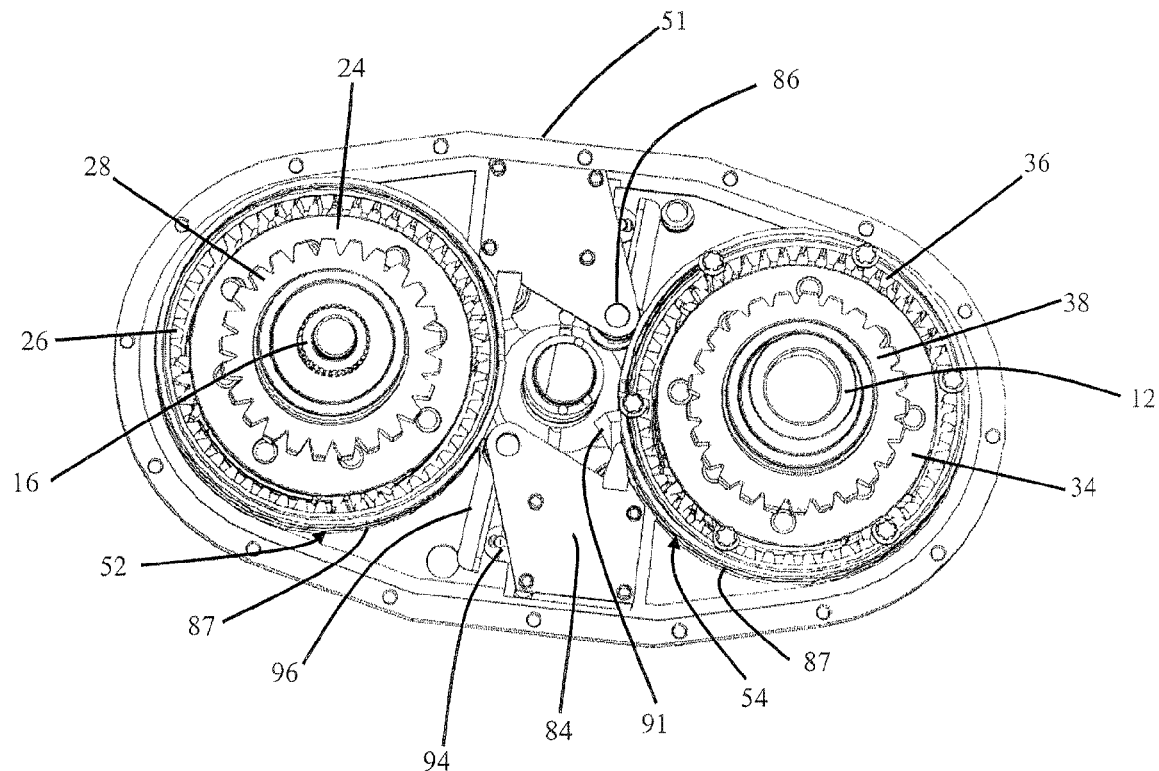
FIG. 5 is an interior view of the front of the transfer case assembly of FIG. 2 having the housing cover removed and the idler gear not shown.

FIG. 5 is an interior view of the front of the transfer case 10 having the housing cover 53 removed and the idler gear 40 not shown. The positioning of the holding member actuator assemblies 84 are also shown positioned in the transfer case housing shell portion 51. The brake bands 87 are shown positioned about the outer drums of ring gears 26, 36, respectively. The adjuster mechanism 93 is also shown engaging the adjuster bar 91 of the brake bands 87. This feature allows optimization of the positioning and tension on the brake bands 87.

As shown in FIGS. 4 and 5, the input shaft 12 has a splined end that mates with corresponding splines on the inner diameter of the gear 28 and sun gear 22 such that the input shaft 12 is coupled to the drive gear 28. The first output shaft 14 has a splined end that mates with corresponding splines on the inner diameter of the planetary carrier 24 of the first planetary gearset 20 such that the first output shaft 14 is coupled to the planetary carrier 24. The second output shaft 16 has a splined end that mates with corresponding splines on the inner diameter of the planetary carrier 34 of the second planetary gearset 30 such that the second output shaft 16 is coupled to the planetary carrier 34. The ring gears 26, 36 slidingly surround the hub of the planetary carriers 24, 34 of the first and second planetary gearsets 20, 30, respectively. A bearing assembly 60 housed in an input bearing housing adapter plate 70 rotatably supports input shaft 12. A bearing assembly 62 housed in a rear output bearing housing 72 rotatably supports first output shaft 14. A bearing assembly 64 housed in the front output bearing housing 74 rotatably supports second output shaft 16. A front bearing cover 76 is shown on an opposite side of the transfer case housing 50 as the front output bearing housing 74.

Figure 6:
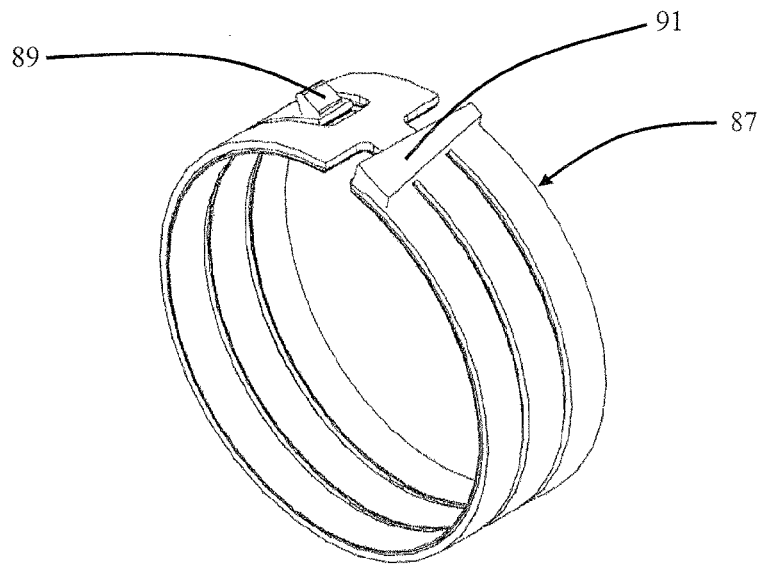
FIG. 6 shows a double wrap brake band having an adjuster mechanism.
Figure 7A:
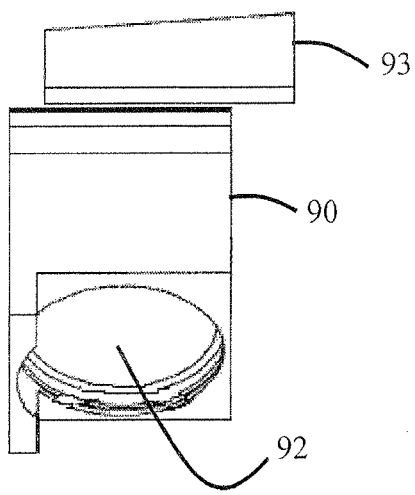
FIG. 7A shows a perspective view of the piston, cylinder, and brake band adjuster.
Figure 7A:
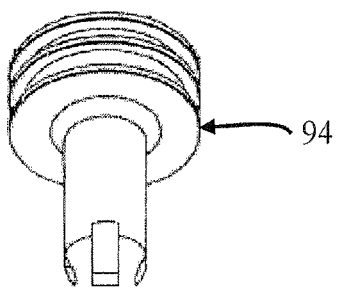
Figure 7B:
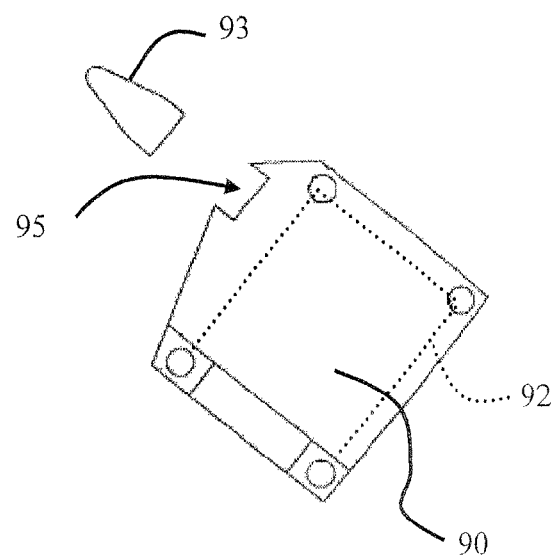
FIG. 7B shows an exploded view of the brake band actuator assembly.
Figure 7B:
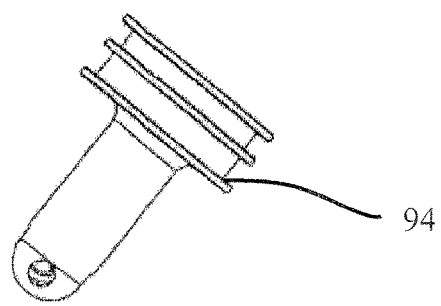

Each holding member 52, 54 comprises actuator assemblies 84, actuation shafts 86 and levers 96, and brake bands 87. A brake band 87 is shown in FIG. 6 as a double wrap brake band having a moveable end 89 and a fixed end 91. The fixed end 91 comprises an angled portion that allows adjustment of the tension/slip of the brake band 87. Although shown as a double wrap band, the invention is not to be limited to such a configuration. Actuator assembly 84 is best shown in FIGS. 7A and 7B and comprises actuator housing 90 having a cylindrical aperture 92 into which a piston actuator 94 is housed. Adjuster mechanism 93 is adjustable in slot 95 to adjust the tension/slip on the brake band 87 using adjustment screws 19. Actuation shaft 86 has a lever 96 engaged by the pneumatic actuator 94 as best shown in FIG. 5. In operation, each pneumatic actuators 94 is individually engaged by a switch positioned near the driver (not shown). An air source (not shown), either on board air or an air source added for the transfer case, is supplied to the pneumatic actuator 94 extending the actuator rod against the lever 96 of the actuation shaft 86, causing the actuation shaft 86 to rotate and apply tension to the brake band such that the brake band 87 engages and holds the ring gear 26, 36. In one configuration, the actuation shafts 86 are mounted parallel to each other and each have a band engagement recess (not shown) adapted for engaging the movable end 89 of the brake band for applying tension to the brake band as the actuation shaft 86 rotates.

It is noted that the transfer case 10 shown in FIGS. 1-7 do not require the shift members, shifting shaft, or shifters extending from the transfer case as required with gear type transfer cases.

Figure 8:
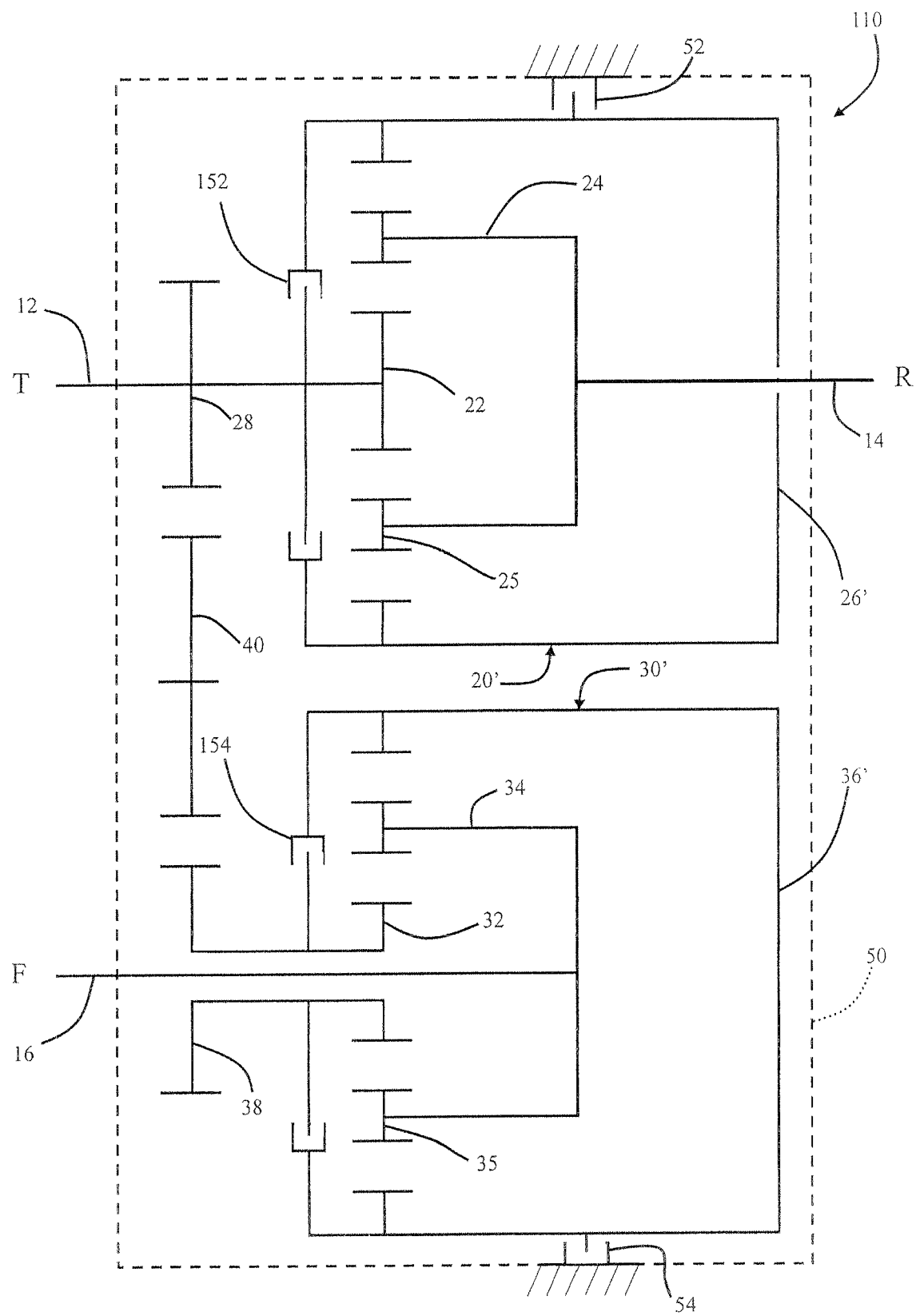
FIG. 8 shows another embodiment of the transfer case of the present invention which provides not only a low gear ratio but also a high gear ratio.

Another embodiment of the transfer case 10 of the present invention is schematically shown in FIG. 8 which provides not only a low gear ratio but also a high gear ratio. The transfer case 110 comprises many of the same elements as transfer case 10. In addition to these elements, transfer case 110 comprises a clutch 152 and 154 associated with each planetary gearset 20' and 30', respectively. Clutches 152 and 154 are selectively engaged to couple the rotation of the sun gear 22, 32 with the ring gear 26', 36'. When two members of a planetary gearset 20', 30' are turned at the same speed, the planetary gearset 20', 30' will act as a solid unit providing a 1:1 high gear ratio. Clutches 152 and 154 may be of any suitable type that will effectively couple the rotation of the sun gear 22, 32 to the ring gear 26', 36', however, for rock crawling it is preferred that the clutch 152, 154 be a multiple disc clutch that allows engagement and disengagement on the fly without the possibility of gear binding.

Figure 9:
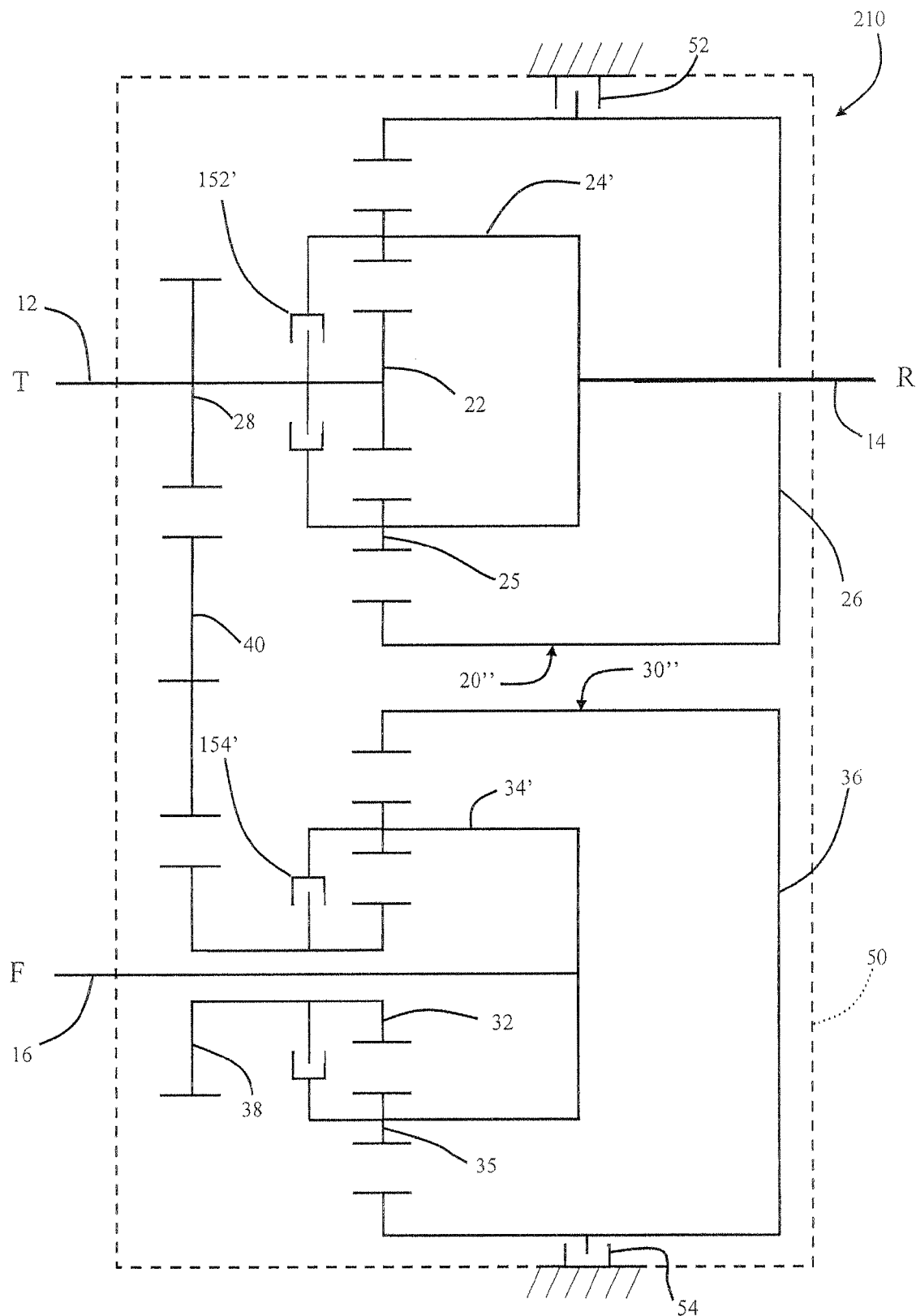
FIG. 9 shows still another embodiment of the transfer case of the present invention which also provides a low gear ratio and a high gear ratio.

A variation of the embodiment shown in FIG. 8 is shown in FIG. 9. In this embodiment, clutches 152' and 154' are associated with each planetary gearset 20" and 30", respectively. Clutches 152' and 154' are selectively engaged to couple the rotation of the sun gear 22, 32 with the planetary carrier 24', 34'. As with the previous embodiment, when two members of a planetary gearset are turned at the same speed, the planetary gearset 20', 30' will act as a solid unit providing a 1:1 high gear ratio. Clutches 152' and 154' may be of any suitable type that will effectively couple the rotation of the sun gear 22, 32 to the ring gear 26', 36', however, for rock crawling it is preferred that the clutch 152', 154' be a multiple disc clutch that allows engagement and disengagement on the fly without the possibility of gear binding.

The provision of a high gear availability allows the rear wheels and the front wheels to each be individually controlled for high, neutral, and low gear. This also allows one set to be put in high gear and one set to be in low gear, which provides a benefit for overcoming some obstacles in rock climbing.

While this invention has been described with reference to preferred embodiments thereof, it shall be understood that such description is by way of illustration and not by way of limitation.

The invention claimed is:

1. A transfer case comprising:
 a housing and a housing cover;
 an input shaft providing power in the form of torque;
 a first output shaft and a second output shaft;
 a first planetary gearset having a sun gear, a carrier having a plurality of planetary gears, and a ring gear, wherein the sun gear is rotatably coupled to the input shaft and the carrier is coupled to the first output shaft;
 a second planetary gearset having a sun gear, a carrier having a plurality of planetary gears, and a ring gear, wherein the carrier is coupled to the second output shaft;
 an idler gear, wherein the idler gear is rotatably driven by a gear rotatably coupled to the input shaft and wherein the idler gear rotatably drives a gear that is attached to the sun gear of the second planetary gearset;
 a first brake band having a movable end and a fix end disposed within the housing adapted to selectively hold the ring gear of the first planetary gear set to cause the first output shaft to rotate in an underdrive condition with respect to the input shaft;
 a second brake band having a movable end and a fixed end disposed within the housing adapted to selectively hold the ring gear of the second planetary gear set to cause the second output shaft to rotate in an underdrive condition with respect to the input shaft;
 a first actuator assembly comprising:
  an first actuation shaft rotatably engaging the movable end of the first brake band adapted for applying tension to the brake band to selectively hold the ring gear of the first planetary gear set;
  a first lever connected to the first actuation shaft; and
  a first actuator selectively engaging the first lever to rotate the first actuation shaft; and
 a second actuator assembly comprising:
  a second actuation shaft rotatably engaging the movable end of the second brake band adapted for applying tension to the brake band to selectively hold the ring gear of the second planetary gear set;
  a second lever connected to the second actuation shaft; and
  a second actuator selectively engaging the second lever to rotate the second actuation shaft.

2. The transfer case of claim 1, wherein the brake bands are double wrap brake bands.

3. The transfer case of claim 1, wherein the position of the fixed end of each brake band is adjustable from the outside of the housing.

4. The transfer case of claim 1, wherein the housing and housing cover are configured to selectively allow a left hand configuration or a right hand configuration.

5. The transfer case of claim 1, wherein no shift members, shifting shaft, or shifters extend from the transfer case.

6. The transfer case of claim 1, wherein the fixed end of the brake band comprises an angled portion, and the transfer case further comprising:
 an adjuster mechanism engaging the angled portion of the brake band adjustable for positioning and tension on the brake band.

7. The transfer case of claim 6 wherein the tension/slip of each of the brake bands is adjustable from the outside of the assembled transfer case.

8. A transfer case comprising:
 an input shaft providing power in the form of torque;
 a first output shaft and a second output shaft;
 a first planetary gearset having a sun gear, a carrier having a plurality of planetary gears, and a ring gear, wherein the sun gear is rotatably coupled to the input shaft and the carrier is coupled to the first output shaft;

a second planetary gearset having a sun gear, a carrier having a plurality of planetary gears, and a ring gear, wherein the carrier is coupled to the second output shaft;

an idler gear, wherein the idler gear is rotatably driven by a gear rotatably coupled to the input shaft and wherein the idler gear rotatably drives a gear that is attached to the sun gear of the second planetary gearset;

a first holding member adapted to selectively hold the ring gear of the first planetary gear set to cause the first output shaft to rotate in an underdrive condition with respect to the input shaft;

a second holding member adapted to selectively hold the ring gear of the second planetary gear set to cause the second output shaft to rotate in an underdrive condition with respect to the input shaft; and a clutch member to couple the rotation of the sun gear of the first planetary gearset with the ring gear or the carrier of the first planetary gearset.

9. The transfer case of claim 8, wherein the first holding member and the second holding members are brake bands.

10. The transfer case of claim 9, wherein the brake bands are double wrap brake bands.

11. The transfer case of claim 9, wherein the position of the fixed end of each brake band is adjustable from the outside of the assembled transfer case.

12. The transfer case of claim 9, wherein each brake band is activated by a piston.

13. The transfer case of claim 9, wherein the fixed end of the brake band comprises an angled portion, and the transfer case further comprising:

an adjuster mechanism engaging the angled portion of the brake band adjustable for positioning and tension on the brake band.

14. A transfer case comprising:

an input shaft providing power in the form of torque;

a first output shaft and a second output shaft;

a first planetary gearset having a sun gear, a carrier having a plurality of planetary gears, and a ring gear, wherein the sun gear is rotatably coupled to the input shaft and the carrier is coupled to the first output shaft;

a second planetary gearset having a sun gear, a carrier having a plurality of planetary gears, and a ring gear, wherein the carrier is coupled to the second output shaft;

an idler gear, wherein the idler gear is rotatably driven by a gear rotatably coupled to the input shaft and wherein the idler gear rotatably drives a gear that is attached to the sun gear of the second planetary gearset;

a first holding member adapted to selectively hold the ring gear of the first planetary gear set to cause the first output shaft to rotate in an underdrive condition with respect to the input shaft;

a second holding member adapted to selectively hold the ring gear of the second planetary gear set to cause the second output shaft to rotate in an underdrive condition with respect to the input shaft; and a clutch member to couple the rotation of the sun gear of the second planetary gearset with the ring gear or the carrier of the second planetary gearset.

15. The transfer case of claim 14, wherein the first holding member and the second holding members are brake bands.

16. The transfer case of claim 15, wherein the brake bands are double wrap brake bands.

17. The transfer case of claim 15, wherein the position of the fixed end of each brake band is adjustable from the outside of the assembled transfer case.

18. The transfer case of claim 15, wherein each brake band is activated by a piston.

19. The transfer case of claim 15, wherein the fixed end of the brake band comprises an angled portion, and the transfer case further comprising:

an adjuster mechanism engaging the angled portion of the brake band adjustable for positioning and tension on the brake band.

* * * * *